Dec. 29, 1931.  S. W. PARTRIDGE  1,838,702
BANANA PROTECTOR
Filed June 5, 1929   2 Sheets-Sheet 1

Stewart W. Partridge
INVENTOR
BY Victor J. Evans
ATTORNEY

Dec. 29, 1931.  S. W. PARTRIDGE  1,838,702
BANANA PROTECTOR
Filed June 5, 1929   2 Sheets-Sheet 2
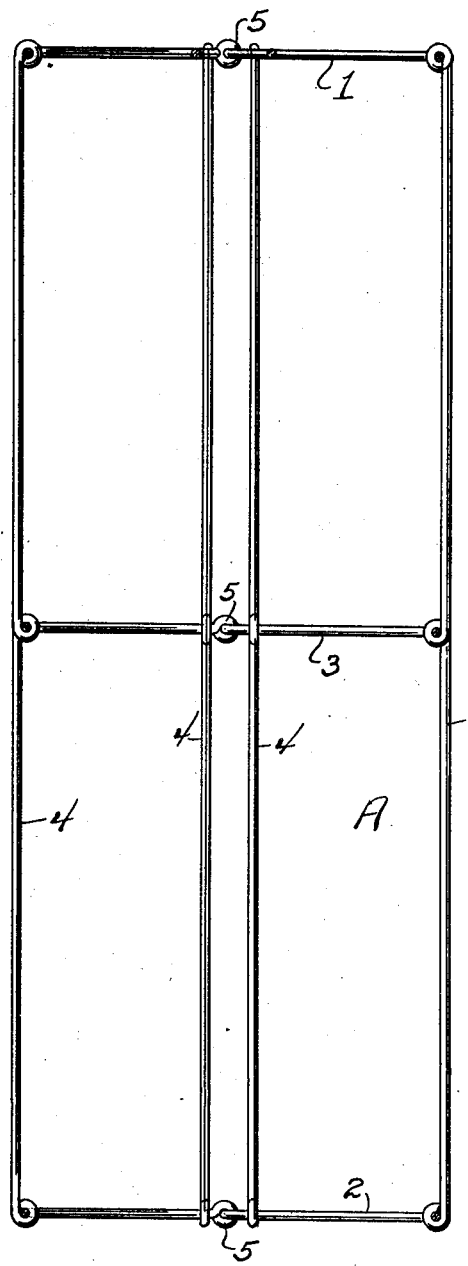
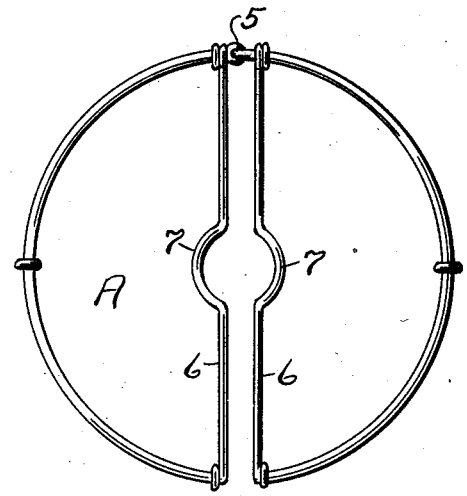
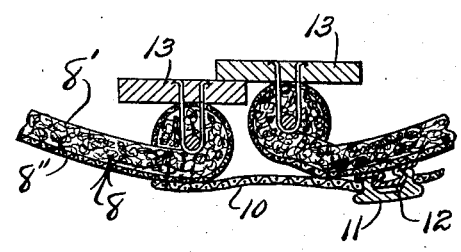
Stewart W. Partridge
INVENTOR
BY Victor J. Evans
ATTORNEY Patented Dec. 29, 1931

1,838,702

UNITED STATES PATENT OFFICE

STEWART W. PARTRIDGE, OF GRAND ISLAND, NEBRASKA

BANANA PROTECTOR

Application filed June 5, 1929. Serial No. 368,677.

This invention relates to a protector device for bananas for preventing the bananas from being affected by cool temperatures, the general object of the invention being to provide a frame preferably of cylindrical shape and formed of two sections which are hingedly connected together, with a covering over the frame whereby when the device is closed, the bunch of bananas therein will be protected from temperature changes while making the bunch easily accessible by opening one section, so that the bananas can be removed from the bunch whenever desired.

Another object of the invention is to provide fastening means for fastening the device in closed position and to provide an opening in the top of the device through which the stem passes.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 4 is a longitudinal sectional view through the frame.

Figure 5 is a top plan view of the frame.

Figure 6 is a section on line 6—6 of Figure 1.

Figure 1:
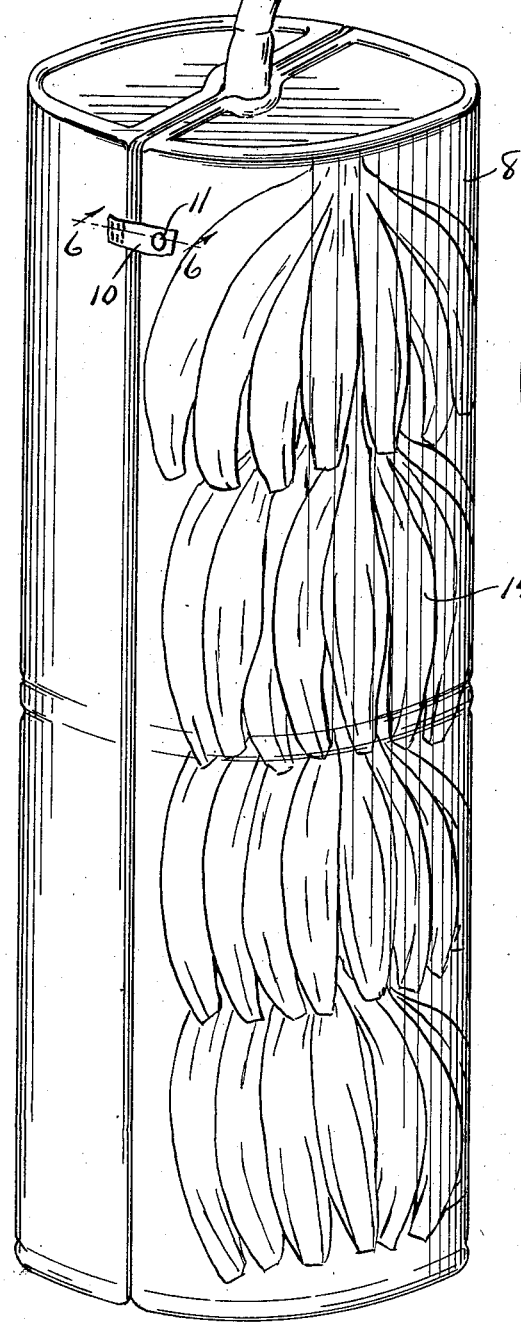
Figure 1 is a perspective view of the device in use.
Figure 2:
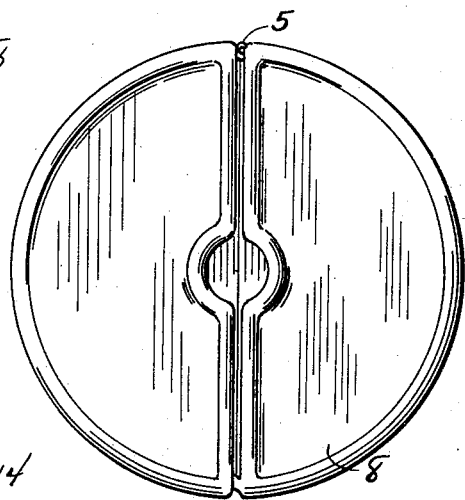
Figure 2 is a top plan view thereof.

In these views, A indicates a cylindrical frame formed of wire and comprising upper and lower rings 1 and 2 and an intermediate ring 3, with the upright members 4 suitably connected with the rings. Each ring is formed of two sections, the adjacent ends of which are hingedly connected together, as shown at 5, so that the frame can be moved to open and closed position. The wire 6 connects the end portions of each section of the upper ring together and this wire may form an extension of the section, if desired. Each wire 6 is curved midway its ends, as shown at 7, to form a recess, the two recesses forming a circular opening when the device is in closed position, through which the stem of a bunch of bananas will pass, as shown in Figure 1.

Figure 3:
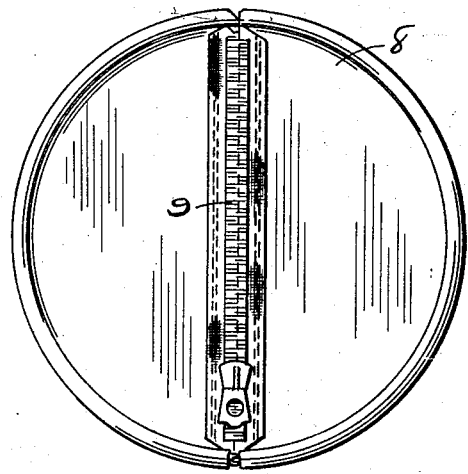
Figure 3 is a bottom plan view.

A cover 8 encloses the frame and this cover is formed of an inner portion 8' of felt or the like and an outer portion 8'' of muslin or the like. The covering extends over the hinged side of the frame and has its front edges connected to the front upright members 4 which are placed adjacent the free ends of the rings. The top part of the cover has its inner edges suitably connected with the cross wires 6 and the bottom portion of the cover has its edges connected together by the zipper type of fastener, as shown at 9 in Figure 3. A strap 10 is fastened to one edge of the cover adjacent the top of the device and this strap carries the female part 11 of a snap fastener, the male part 12 of which is secured to the other edge of the cover so that when the strap is held to the cover by the snap fastener, the upper portion of the device will be held closed, the bottom part being held closed by the fastener 9.

A strip 13 of wood or the like is fastened to each front upright 4, as shown in Figure 6, so that when the device is in closed position, these strips will overlap and thus provide a tight closure at the front of the device. The outer part 8'' of the cover has printed or otherwise placed thereon the representation of a bunch of bananas, as shown at 14, so that one will know that the device contains a bunch of bananas.

From the foregoing it will be seen that I have provided a simple device for covering a bunch of bananas, the device being so formed that it can be easily opened to permit the bunch to be placed therein or bananas removed from the bunch and when closed, the device will prevent temperature changes from affecting the bananas, as it is a well known fact that when the temperature drops to below 45°, bananas will be injured. As shown in Figure 1, the device entirely encloses the bunch, but leaves the stem free and the device can be easily opened by detaching the fastener on the strap 10 and releasing the fastener 9 at the bottom of the device. Either half of the device can be moved to open position.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is :—

1. A protector for bananas comprising a wire frame formed of ring-shaped members, each ring-shaped member being formed of two sections which are hingedly connected together, a cross member connecting the end portions of each section of the upper ring together, each cross member having its center bent to form a semi-circular recess, the two recesses forming a circular opening when the frame is in closed position, a covering fastened to the frame and enclosing the sides and ends thereof, with the edges of the top portion of the covering secured to the cross members, a sliding fastener for detachably connecting together the edges of the lower part of the cover, a strap secured to one front edge of the cover adjacent the top thereof, a snap fastener for connecting the strap with the other front edge whereby a bunch of bananas can be placed in the device with its stem extending through the opening in the top of the device.

2. A banana crate comprising relatively spaced side members, pairs of semi-circular end members connected to the ends of the side members, means hinging the end members of each pair together, reinforcing elements connecting the ends of the end members of one pair and provided with offset portions to receive the stalk of a bunch of bananas, and a cover carried by said members.

STEWART W. PARTRIDGE.